(12) United States Patent
Waltermann et al.

(10) Patent No.: US 12,247,877 B2
(45) Date of Patent: Mar. 11, 2025

(54) DEVICE FOR OPTICAL APPLICATIONS

(71) Applicant: FiSens GmbH, Braunschweig (DE)

(72) Inventors: Christian Waltermann, Goslar (DE); Philip Erik Guhlke, Berlin (DE); Jan Koch, Goslar (DE); Wolfgang Schippers, Braunschweig (DE)

(73) Assignee: FiSensGmbh, Braunschweig (DE)

( * ) Notice: Subject to any disclaimer, the term of this patent is extended or adjusted under 35 U.S.C. 154(b) by 506 days.

(21) Appl. No.: 17/637,242

(22) PCT Filed: Jul. 9, 2020

(86) PCT No.: PCT/EP2020/069438
§ 371 (c)(1),
(2) Date: Feb. 22, 2022

(87) PCT Pub. No.: WO2021/043470
PCT Pub. Date: Mar. 11, 2021

(65) Prior Publication Data
US 2022/0341763 A1    Oct. 27, 2022

(30) Foreign Application Priority Data
Sep. 2, 2019    (DE) .................... 10 2019 123 468.9

(51) Int. Cl.
*G01J 3/18*    (2006.01)
*G02B 6/124*    (2006.01)
(Continued)

(52) U.S. Cl.
CPC ............ *G01J 3/1895* (2013.01); *G02B 6/124* (2013.01); *G02B 6/4287* (2013.01);
(Continued)

(58) Field of Classification Search
CPC .... G02B 6/0208; G02B 6/124; G02B 6/4287; G01D 5/3538; G01D 5/35316; G01J 3/0259; G01J 3/1895; G01J 9/00
See application file for complete search history.

(56) References Cited

U.S. PATENT DOCUMENTS 5,982,962 A    11/1999    Koops et al.
6,885,792 B2    4/2005    Eggleton et al.
(Continued)

FOREIGN PATENT DOCUMENTS

DE          42 09 672          7/1993
DE    10 2016 214 887          2/2018
(Continued)

*Primary Examiner* — Michael P Mooney
(74) *Attorney, Agent, or Firm* — Salter & Michaelson

(57) ABSTRACT

The invention relates to a device for optical applications, which has an optical waveguide (10), to which a light source (11) can be connected. The optical waveguide (10) is designed in such a way that light emitted by the connectable light source (11) propagates along a light propagation axis (12). A wavelength-sensitive grating structure (13) in the optical waveguide (10) has detectors (20), which are arranged in such a way that the detectors absorb partial amounts of the light of the light source (11) that is scattered by the wavelength-sensitive grating structure (13). The grating structure (13) in the optical waveguide (10) is constructed of periodically arranged ellipsoid structural elements (14). The ellipsoid structural elements (14) have a different index of refraction than the material of the optical waveguide (10) surrounding the ellipsoid structural elements. The ellipsoid structural elements (14) have a longitudinal axis and a short axis, which are substantially perpendicular to the light propagation axis (12). Depending on the wavelength, partial amounts of the light scattered by the grating structure (13) are coupled out of the optical waveguide (10). The light hits the detectors (20). An absorbing or
(Continued)

partially reflecting filter (30) is arranged between at least one of the detectors (20) and the optical waveguide (10). The detectors (20) have measuring elements for the intensity of the partial amount of the light that hits the detector (20) in question. An evaluation element is provided, which determines a wavelength from the intensity ratio of the plurality of detectors (20). The detectors (20) are arranged in such a way that the detectors either are arranged opposite each other on different sides of the long axes of the

9 Claims, 3 Drawing Sheets

(51) Int. Cl.
*G02B 6/42* (2006.01)
*G01D 5/353* (2006.01)
*G01J 3/02* (2006.01)
*G01J 9/00* (2006.01)
*G02B 6/02* (2006.01)

(52) U.S. Cl.
CPC ....... *G01D 5/35316* (2013.01); *G01D 5/3538* (2013.01); *G01J 3/0259* (2013.01); *G01J 9/00* (2013.01); *G02B 6/0208* (2013.01)

(56) References Cited

U.S. PATENT DOCUMENTS

| | | |
|---|---|---|
| 10,337,918 B1 | 7/2019 | Kruspe et al. |
| 10,969,541 B2 | 4/2021 | Schade et al. |
| 11,237,060 B2 | 2/2022 | Schmid |
| 2004/0056183 A1 | 3/2004 | Eggleton et al. |
| 2007/0110367 A1 | 5/2007 | Walker et al. |
| 2020/0018647 A1* | 1/2020 | Waltermann .......... G01J 3/0218 |

FOREIGN PATENT DOCUMENTS

| | | |
|---|---|---|
| DE | 10 2017 119 810 | 2/2019 |
| EP | 0 840 150 | 6/1998 |
| WO | 98/44366 | 10/1998 |
| WO | 2018/153868 | 8/2018 |

\* cited by examiner

DEVICE FOR OPTICAL APPLICATIONS

TECHNICAL FIELD

The invention relates to a device for optical applications, having an optical waveguide to which a light source can be connected, wherein the optical waveguide is designed in such a way that light emitted by the connectable light source propagates along a light propagation axis, having a wavelength-sensitive grating structure in the optical waveguide, and having detectors that are arranged in such a way that they absorb partial amounts of the light of the light source that is scattered by the wavelength-sensitive grating structure.

BACKGROUND OF THE INVENTION

Devices for optical applications that have an optical waveguide are widely known. The light is guided and propagates in the optical waveguide in a propagation direction and feeds a light source.

Already described in DE 42 09 672 C1 is a device for determining the wavelength of optical radiation, which operates with an optical waveguide having a wavelength-sensitive grating structure. At the grating structures, radiation is coupled out and impinges on associated detectors, which are part of a spectrophotometer. A similar design is also shown in U.S. Pat. No. 5,982,962 A.

Known from U.S. Pat. No. 6,885,792 B2 is a system for monitoring light wavelengths in optical fibers. In this case, light that is coupled out at the grating structures impinges on detectors.

Another system for monitoring light wavelengths in an optical waveguide with grating structures is described in US 2007/0110367 A1.

Of increasing interest are applications in which what is involved is the closer examination of light of the light source that has a specific wavelength of interest, but which has been subjected to certain influences. In such cases, intensity maxima or intensity minima, for instance, are to be examined more closely and the spectral characteristics of the corresponding light in the region of this wavelength are of interest.

Known from DE 10 2017 119 810 B4, for example, is a proposal in which light of this kind is guided via a light entry aperture to an optoelectronic chip. In this chip, a transmission filter is arranged at an angle to the light propagation axis. The filter reflects a partial amount of the light that impinges on a first detector and permits another partial amount to pass through and to impinge on a second detector. The measured values of the two detectors can then be placed in relation to each other and thereby allow conclusions to be drawn.

The use of the design described therein is intended to make it possible to dispense with the hitherto conventional utilization of separate beam splitters in devices of this kind, because, at the same time, the filters fulfill the task of splitting the beams into two parts. In spite of the proposals for such a concept, the operation involves a very clear beam splitting and relatively large structural elements and raises the question as to whether alternative solutions could also have advantages.

Other proposals for evaluating light wavelengths in optical applications are susceptible to thermal interferences and, depending on the ambient conditions, afford varying results. Some general problems are also the speed of the evaluation, often complex optical structures, and structural elements that are too large.

Known for other purposes of application are devices for optical applications that have optical waveguides that operate using so-called fiber Bragg gratings, such as those that are basically known from WO 1998/44366 A1, for example, and have also been described in WO 2018/153868 A1. Described therein is also a special form for grating structures with a plurality of ellipsoidal separate structures in optical waveguides.

The object of the invention, in contrast, is to propose a generic device for optical applications that has an optical waveguide that is as simple as possible in design, is less susceptible to thermal interferences, and makes possible a high-frequency evaluation of wavelengths.

SUMMARY OF THE INVENTION

This object is achieved by means of the invention for a generic device in that the grating structure in the optical waveguide is constructed of periodically arranged ellipsoid structural elements, wherein the ellipsoid structural elements have a different index of refraction from that of the material of the optical waveguide surrounding the ellipsoid structural elements, wherein the ellipsoid structural elements have a longitudinal axis and a short axis that are substantially perpendicular to the light propagation axis, so that, depending on the wavelength, partial amounts of the light scattered by the grating structure are coupled out of the optical waveguide and impinge on the detectors, wherein an absorbing or reflecting filter is arranged between at least one of the detectors and the optical waveguide, wherein the detectors have measuring elements for the intensity of the partial amount of the light that impinges on the detector in question, wherein an evaluation element is provided that determines a wavelength from the intensity ratio of the plurality of detectors, and wherein the detectors are arranged in such a way that they are arranged opposite one another on different sides of the long axes of the ellipsoid structural elements in the grating structure or are arranged on only one side of the long axes of the ellipsoid structural elements of the grating structure, wherein they are positioned in such a way that they capture a different scattered diffraction order of the examined wavelength; or two groups of detectors are provided, of which one group is composed of at least two detectors, which are arranged opposite each other on different sides of the long axes of the ellipsoid structural elements in the grating structure, and the other group of detectors is composed of at least two detectors, which are arranged on only one side of the long axes of the ellipsoid structural elements of the grating structure, wherein they are positioned in such a way that they capture a different scattered diffraction order of the examined wavelength.

The invention departs fully from the concept of DE 10 2017 119 810 B4. Instead of constructing and arranging large-format transmission filters and detectors within a housing and guiding all of the light to be examined via a beam splitter to detectors by means of a transmission filter and a partial transmission, an entirely new path is taken and the light of the light source to be examined is scattered out of the optical waveguide by means of a grating structure and the scattering pattern resulting from a specific grating structure is utilized for the intended guiding of the partial amounts of the light in the direction of the detectors.

The changes of a light wavelength in an optical waveguide can be determined in a robust and reproducible manner in this way. The entire construction is very small and does not necessitate any complex optical structures, but merely requires a modification of the optical waveguide itself and some of the elements placed next to the optical waveguide or else on the optical waveguide as additional layers. This also means that the overall construction is less susceptible to thermal interferences, since, as a result of the very short paths and distances, there are practically no thermal differences between the positions in the device.

Use is hereby made of specific technical effects. A strongly focused femtosecond laser beam can produce microscopic structures in optical waveguides, such as, for example, glass fibers, various polymers, or even planar layers made up of planar materials that scatter internally guided light. The typically strongly elliptical form of the laser focus in such a femtosecond laser beam leads to a markedly preferred scattering in the direction of the long axes of the ellipsoid structure that is produced in this way.

If, in addition, a plurality of such structures of an overall construction have a periodicity, the individually scattered portions of light interfere with one another. The light of a specific wavelength that is propagated in the optical waveguide is then scattered nearly exclusively at specific solid angles by this plurality of ellipsoid structures. These solid angles correspond to constructive interferences of the Bragg condition in different orders.

Depending on the periodic construction of a grating made up of the individual elements, it is possible to vary the directions of the resulting out-coupled beams for a specific wavelength. For a period of exactly half a wavelength, light is reflected only directly inside of the fiber of the optical waveguide; that is, it is diffracted by exactly 180°. This special case corresponds to a conventional fiber Bragg grating. A grating structure with a spacing corresponding exactly to the wavelength produces, in addition, exactly one beam emitted perpendicular to the fiber of the optical waveguide. If a grating structure with periodic spacings of 1.5 times the wavelength of the propagated light is considered, then a second beam is created. If a grating structure with twice the spacing of the individual elements is considered, then a third beam is created, and so forth.

By making relatively simple modifications in the period, moreover, it is possible to focus or defocus the beam itself. Closer examination of a grating structure of this kind and of modifications thereof, albeit for a different purpose, is presented in WO 2018/153868 A1.

All mentioned beams and also the two preferred out-coupling directions for the propagated partial amounts of the light are produced by the same grating structure. This means that the directions correlate to each other in a defined manner and, in particular, also the ratio of the intensities of the partial amounts on all beams to one another is constant.

In accordance with the invention, two detectors on which the out-coupled light is to impinge are then provided. Hence, for two arrangements that are applicable alternatively to each other, the effect in accordance with the invention now ensues.

In the first case, two different beams are needed. In the other case, the two preferred out-coupling directions of a specific scattering order of the grating structure are utilized. In both cases, the measurement of the detector takes place independently of temperature influences, losses, or even mechanical stresses in the waveguide, because the temperature influences act equally on both partial beams and losses or mechanical stresses in the optical waveguide either do not arise at all or else affect both partial amounts equally.

The same holds true for different polarization states that can arise in the optical waveguide.

Therefore, a constant intensity ratio of the beams or of the partial amounts of the propagated light is formed.

By means of the invention, therefore, it is possible to determine light wavelengths or changes in the light wavelengths of the light guided and propagating in the fiber core of the optical waveguide. This light is scattered at the grating structure. In addition, at least one wavelength-selective light filter is placed in the one beam path between the grating structure and one of the detectors. By exploiting the constant intensity ratio of the partial amounts of the propagated light or of the beams, a wavelength-dependent intensity change in the ratio of the two detectors is measured.

If the light wavelengths to be examined are then varied, the ratio of the signals between the two detectors also changes. This is due to the fact that the appropriately chosen filter in the beam path transmits either more or less light, so that more or less light impinges on the detector. The corresponding ratio can be calculated back to a change in the light wavelength given a knowledge of the spectral characteristics of the chosen filter.

The solution in accordance with the invention is especially advantageous in terms of the ability to extremely miniaturize it. The grating structure that is required for it needs to use only a few 100 of the above-mentioned ellipsoid structural elements. The consequence thereof is that the two light beams or the partial amounts of the propagated light can be separated from each other even on the smallest possible construction space. In this way, it is conceivable to achieve a total construction size of only a few millimeters for an analysis of a light wavelength.

DESCRIPTION OF THE DRAWINGS

Further advantages and preferred features are presented in the dependent claims and in the following description of the figures.

Depicted in detail in the drawing are various embodiments of a device according to the invention.

Figure 1:
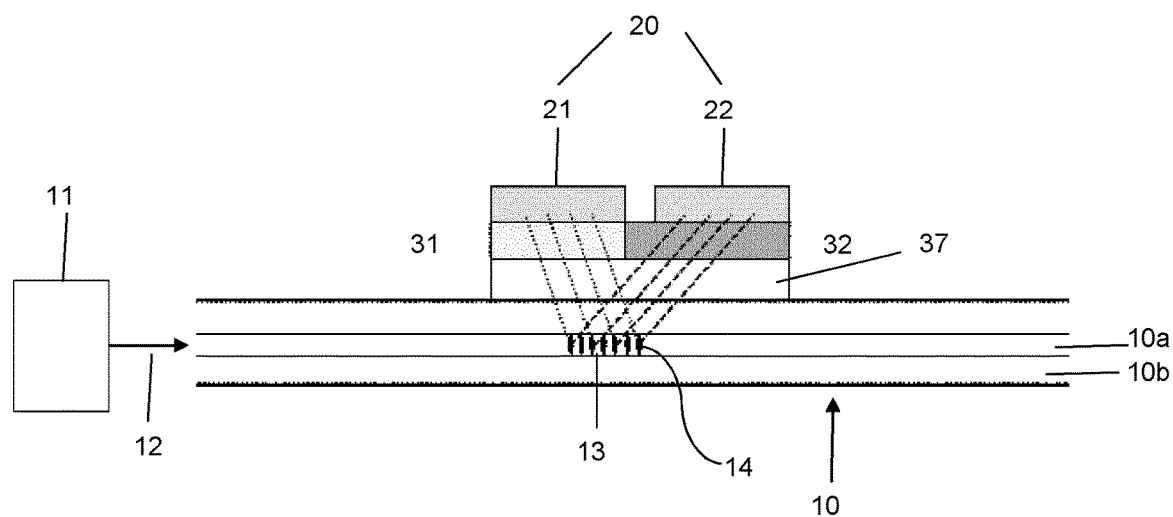
Figure 2:
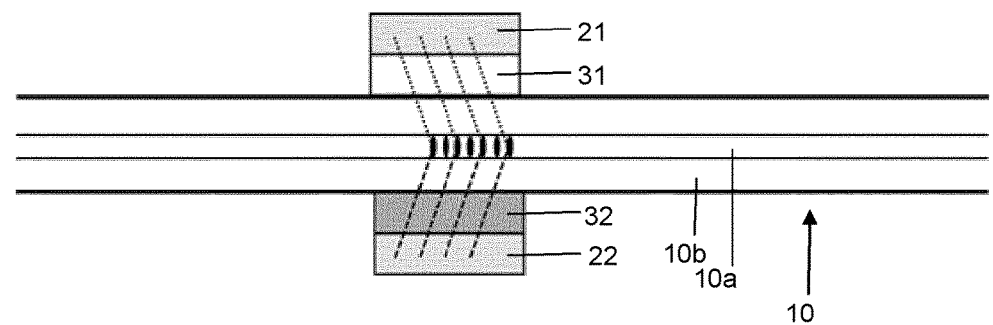
Figure 3:
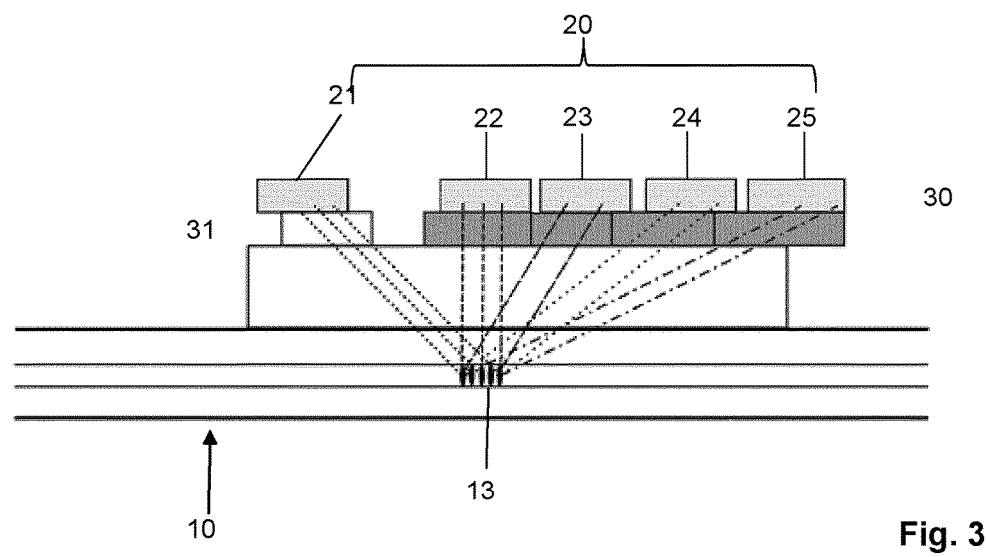
Figure 4:
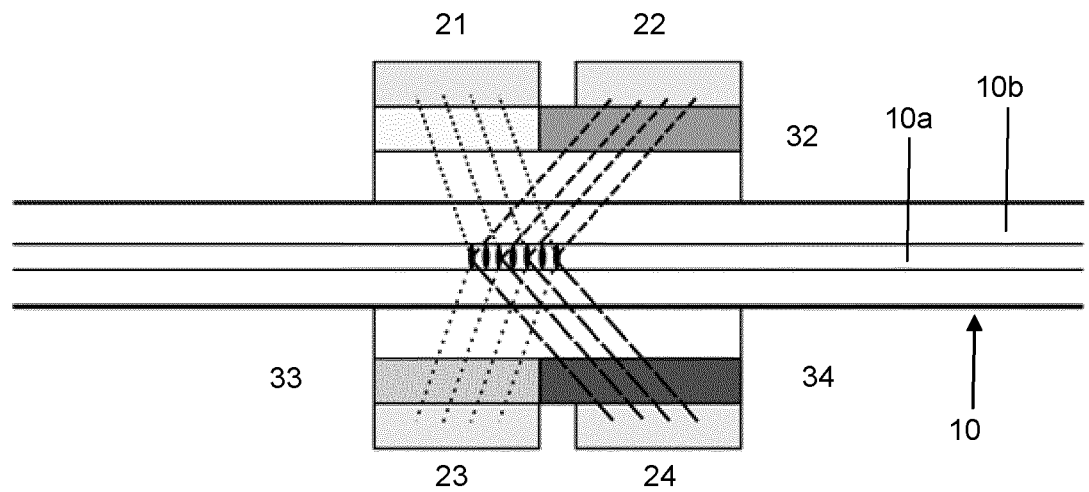
Figure 5:
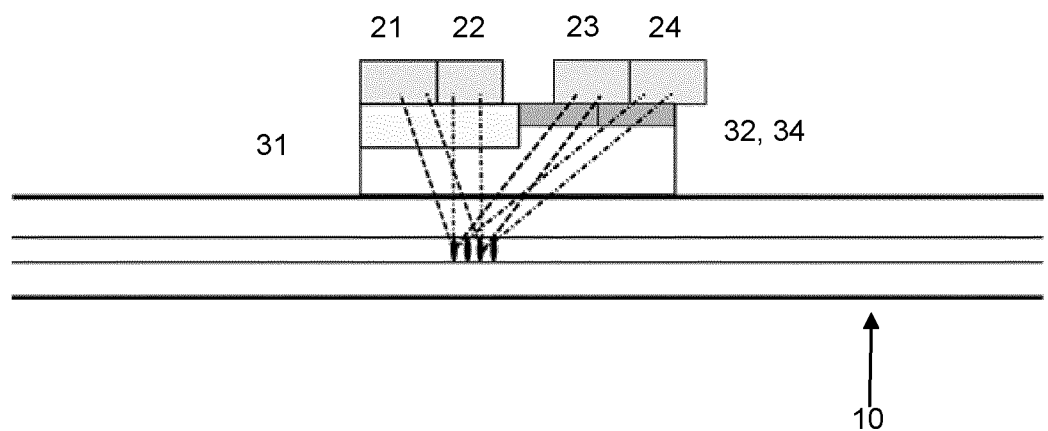
Figure 6:
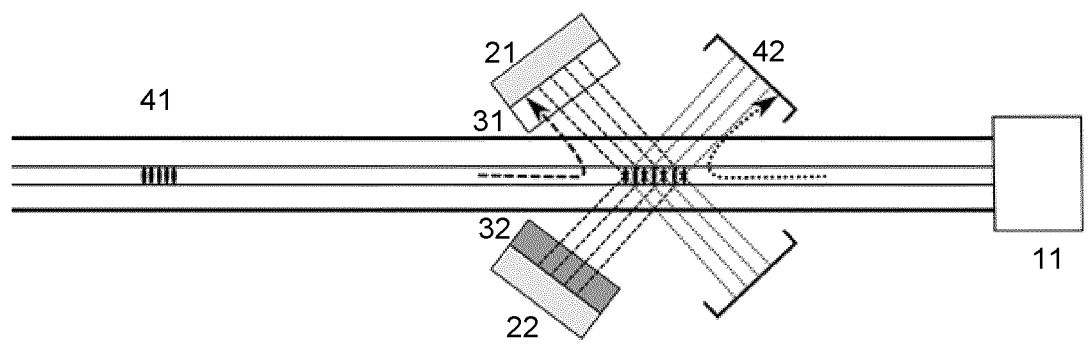

Shown are:

FIG. 1 a schematic illustration of a first embodiment of the invention;

FIG. 2 a schematic illustration of the second embodiment of the invention;

FIG. 3 a third embodiment of the invention;

FIG. 4 a fourth embodiment of the invention;

FIG. 5 a fifth embodiment of the invention;

FIG. 6 a sixth embodiment of the invention; and

Figure 7:
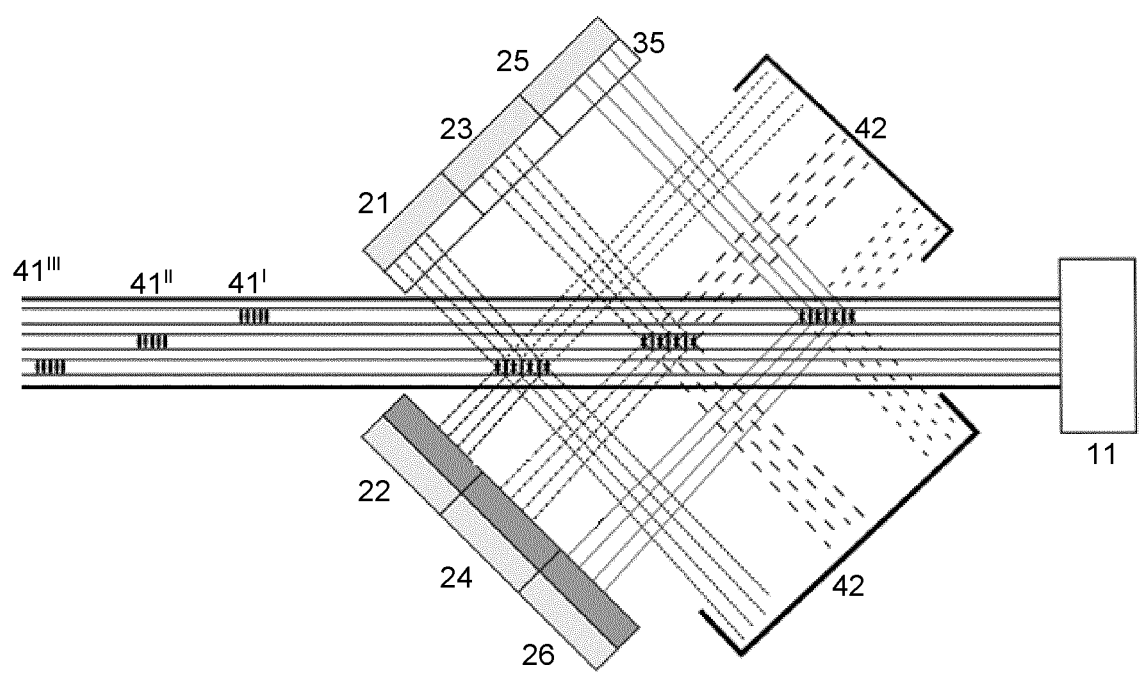

FIG. 7 a seventh embodiment of the invention

DETAILED DESCRIPTION

Shown in FIG. 1 is a basic schematic illustration of a simplified embodiment of the invention. Seen here is an optical waveguide 10 that extends horizontally in the image plane.

Schematically, it is also possible to imagine a connectable light source 11, which is only indicated here, at the end of the optical waveguide 10.

Light is emitted from the light source 11 into the optical waveguide 10 and then propagates along a light propagation axis 12 in the optical waveguide 10.

As can be further seen, a central element for the embodiment of the invention is a grating structure 13.

The grating structure 13 is arranged in the interior portion of the optical waveguide 10, that is, in a fiber core 10a. The fiber core 10a is surrounded by a cladding 10b.

The grating structure 13 is composed of a plurality of small ellipsoid structural elements 14, which are only indicated here. Both the longitudinal axis and a short axis of the ellipsoid structures 14 are perpendicular to the light propagation axis 12 inside of the optical waveguide 10.

It is further schematically illustrated that at least two detectors of a group of detectors, indicated overall with the reference number 20, are provided. The detectors 20 are situated outside of the optical waveguide 10 and also outside of the cladding 10b of the optical waveguide 10.

Situated between the two detectors 20 and the optical waveguide 10 is, in each case, one filter of a group 30 of filters. Situated between a first detector 21 and the cladding 10b of the optical waveguide 10 is at least one first filter 31. Situated between a second detector 22 and the outer side of the cladding 10b of the optical waveguide 10 is a possible second filter 32. The partial amounts of the propagated light that are scattered and refracted by the grating structure 13 are guided out of the core 10a of the optical waveguide 10 through the cladding 10b and a filter 31 or 32 situated at the respective location relative to the detector 21 or 22 that is arranged outside of the filter.

The partial amounts of the scattered light represent, as regarded in themselves, defined beams and propagate in space separated from one another, so that always only a scattered partial amount impinges on each detector 20. The scattered partial amounts are depicted in the schematic illustration as differently dashed lines.

It can also be seen from the schematic illustration that, in addition, it is possible to arrange a fastening element or place holder 37, which can be identical for the two detectors 21 and 22, between the filters 31 and 32 and the optical waveguide 10.

The detectors are therefore exposed to different partial amounts of light on account of one or both of the filters 31 and 32 and it is possible from this to draw conclusions about the wavelength of the propagating light in the optical waveguide 10.

The spacing of the individual ellipsoid structural elements 14 of the grating structure 13 should be greater than 120% of the examined wavelength. This specification is given in relation to the index of refraction in the optical waveguide 10. In this way, it is possible to ensure that two orders of the propagating light are coupled out of the grating structure 13.

Beyond this, the spacing between the optical waveguide 10 and the detectors 20 should be chosen to be sufficiently large that the individual beams of the two out-coupled orders that are used are fully spatially separated from one another. Typically, for this purpose, the chosen spacing is as large as the entire grating structure 13 inside of the core 10a of the optical waveguide 10.

In order to achieve this goal, it is appropriate to define and choose correspondingly the above-mentioned place holder 37.

Seen in FIG. 2 is a schematic illustration of an alternative arrangement with another embodiment of the invention. However, the elements used are basically the same.

Seen once again is an optical waveguide 10 with a core 10a and a cladding 10b. Situated in the interior of the core 10a is once again a grating structure 13 with ellipsoid structural elements 14, whereby, for better overview, these two reference numbers are omitted in FIG. 2.

Provided around the outside of the cladding 10b of the optical waveguide 10 is once again a layer with the filters 31 and 32 and the detectors 21 and 22 of the entire detector group 20 are placed outside of the filters 31 and 32 of the filter group 30.

In the embodiment of FIG. 2, two detectors 21 and 22, lying opposite each other, capture the impinging light. They compare the light that is coupled out of the optical waveguide 10 by means of the grating structure 13 by use of different filters 31 and 32.

In addition to these fundamentally schematic arrangements, more complicated and thus more efficient embodiments that make use of the inventive concepts are also possible.

Such an embodiment can be seen, for instance, in FIG. 3. It presents a kind of multichannel system with a plurality of scattered refraction orders.

It is conceivable, by means of the grating structure 13, to produce not just two orders, but also three or more orders. These different orders can then be imaged on not only two, but also on more detectors of the detector group 20. Appropriately used as detectors are photodiodes and, in particular, an array composed of a plurality of photodiodes. However, as detectors 20, pixels of an image sensor can serve just as well, if these pixels are large enough in order to capture only a scattered partial amount of the light in each case.

Through the use of one filter or different filters 30, it is also possible to use the detector group 20 to evaluate a plurality of different wavelengths of the propagating light in the optical waveguide 10.

If a plurality of orders are produced and are imaged on different detectors 20, it is additionally possible to utilize diverse filters 30, such as, for example, polarization filters. In this way, it is possible to determine, in addition to the wavelength of interest and its change, also a change in the polarization Illustrated in FIG. 4 is a further development of this idea. It is seen here in an embodiment by way of example that the change in the wavelength of the propagating light in the optical waveguide 10 is determined by means of the first out-coupled order and the intensity ratio between the measured values of the detectors 21 and 23, whereby a wavelength-selective filter 33 has been positioned in front of the detector 23.

In addition, by way of a second out-coupled order and the intensity ratio of the detectors 22 and 24, it is possible to measure a polarization change as a function of the wavelength. For this purpose, two polarization filters 32 and 34 are positioned, which are aligned linearly perpendicularly to each other.

In FIG. 5, a multichannel system with wavelength ranges and a plurality of detectors 20 is described. The reference number of the detector group 20 is omitted for reasons of clarity.

In this embodiment, the further scattered partial amounts and their out-coupling angle depend, in particular, on the wavelength ranges. For example, light of the wavelength range 820-825 mm* and light of the wavelength range 830 nm-835 nm can scattered at the grating structure 13 in such a way that, as defined beams that are separated from each other, the light can be measured by different detectors 20. In one embodiment, it is possible in this case to provide a plurality of detectors 20 that are each arranged adjacent to one another and thus to shift them slightly towards one another. The arrangement is thereby made in such a way that the detectors solely capture the out-coupling of a specific wavelength range. Each pair of detectors thus functions as its own measurement channel and can be utilized in parallel.

Here, one of the two detectors of a pair serves as a reference and the other detector of the pair serves as the signal to be evaluated.

In another, especially preferred embodiment of FIG. 6, the grating of the grating structure 13 (the reference number is not depicted) is chosen in such a way that a light that propagates in opposite directions through the optical waveguide 10 propagates in a different direction for the examined wavelength for all orders and it is thereby possible to distinguish them from one another.

This is possible for grating point spacings in the grating structure 13 of 50 to 90% of the examined wavelength as well as of 110 to 140% and of 170 to 180%, in relation to the index of refraction in the light guide 10.

In this case, it is possible, at the one end of the optical waveguide 10, to couple in light directly from the light source 11, and the initially scattering light is eliminated via a beam trap 42. Solely an initially transmitted portion of the light is reflected at a fiber Bragg grating 41, for example, in the further course of the optical waveguide 10. The detectors 21, 22 are aligned in such a way that they can capture constructive scattering directions of the reflecting signal. This embodiment represents a highly simplified and advantageous sensor system with an additional fiber Bragg grating 41. Such a system may also be referred to as an FBG sensor system.

A simplified sensor system, composed of a light source 11 and a fiber Bragg grating 41 at the ends of the optical waveguide 10 as well as a grating structure 13, a photodiode pair as detectors 20, and filters 30 as well as a scattered light trap 42, can be seen in FIG. 6. The spatial asymmetry of the scattered light is exploited here, depending on the direction of light propagation.

In addition, the illumination of the grating structure 13 from the one end of the optical waveguide 10 with the light source 11 and the positioning of one fiber Bragg grating or a plurality of fiber Bragg gratings 41 along the optical waveguide 10 at the other end is especially advantageous.

As light source 11, it is possible to utilize LEDs, SLEDs, micro LEDs, or tunable lasers or other light sources.

Illustrated in FIG. 7 is a multichannel evaluation, in which, as optical waveguide 10, so-called multicore fibers are utilized.

In a multicore fiber as optical waveguide 10, it is possible to evaluate a plurality of channels. For this purpose, a separate grating structure 13 is assigned to each core 10*a* of the optical waveguide 10. Moreover, in each case, at least two detectors 20 and at least one filter 30 are put in place.

In an advantageous embodiment, such a multichannel evaluation is bidirectional in design for the measurement of at least one fiber Bragg grating 41 per core 10*a* of the optical waveguide 10, as in the embodiment of FIG. 6. Light that propagates from the light source 11 and is coupled out by the respective ellipsoid structural elements 14 of the grating structures 13 of the plurality of cores 10*a* of the optical waveguide 10 is eliminated in scattered light traps 42.

Light that is reflected back once again by the respective fiber Bragg gratings 41 and is coupled out at the grating structures 13 is radiated onto detectors 20 arranged in pairs.

Seen in FIG. 7 is the multichannel sensor system, which has a light source 11 and, in each case, at least one fiber Bragg grating 41 and a grating structure 13 as well as a photodiode pair as detectors 20 with filters 30 and a scattered light trap 42 for each core 10*a* of the optical waveguide 10.

Via the respective intensity ratios of the detectors 20 or photodiode pairs and the wavelength-sensitive filters 30 in front of them, it is possible to measure changes in the wavelengths of the fiber Bragg grating 41 for each glass fiber core 10*a*.

In FIG. 7, the detectors 21 and 22 show with their measured values or the ratio of their measured values the change of the wavelength due to the fiber Bragg grating 41'''. The detectors 23 and 24 show with their measured intensity the change of the wavelength due to the fiber Bragg grating 41". The detectors 25 and 26 show with their measurement in the ratio of the intensities the change of the light wavelength due to the fiber Bragg grating 41'.

REFERENCE Numbers

10 optical waveguide
10*a* fiber core
10*b* cladding of the optical waveguide 10
11 light source
12 light propagation axis
13 grating structure
14 ellipsoid structural elements
20 group of detectors
21 detector
22 detector
23 detector
24 detector
25 detector
26 detector
30 group of filters
31 filter
32 filter
37 place holder
41 fiber Bragg grating
41' fiber Bragg grating
41" fiber Bragg grating
41''' fiber Bragg grating
42 scattered light trap

What is claimed is:

1. A device for optical applications, comprising
an optical waveguide, to which a light source can be connected, wherein the optical waveguide is designed in such a way, that light emitted by the connectable light source propagates along
a light propagation axis, a wavelength-sensitive grating structure in the optical waveguide, detectors that are arranged in such a way that they absorb partial amounts of the light of the light source that is scattered by the wavelength-sensitive grating structure, wherein the grating structure in the optical waveguide is constructed from periodically arranged ellipsoid structural elements,
wherein the ellipsoid structural elements have an index of refraction that is different from that of the surrounding material of the optical waveguide,
wherein the ellipsoid structural elements have a longitudinal axis and a short axis that are substantially perpendicular to the light propagation axis, so that, depending on the wavelength, partial amounts of the light from the optical waveguide that is scattered by the grating structure will be coupled out and impinges on the detectors,
wherein an absorbing or partially reflecting filter is arranged between at least one of the detectors and the optical waveguide,
wherein the detectors have measuring elements for the intensity of the partial amount of light that impinges on the detector in question, wherein an evaluation element is provided, which determines a wavelength from the intensity ratio of the plurality of detectors, and wherein the detectors are arranged in such a way that they a) are arranged opposite one another on different sides of the long axes of the ellipsoid structural elements in the grating structure, or b) are arranged on only one side of the long axes of the ellipsoid structural elements of the grating structure, wherein they are positioned in each case so that they capture a different scattered diffraction order of the examined wavelength, or c) two groups of detectors are provided, of which one group is composed of at least two detectors, which are arranged opposite each another on different sides of the long axes of the ellipsoid structural elements in the grating structure, and the other group of detectors is composed of at least two detectors, which are arranged on only one side of the long axes of the ellipsoid structural elements of the grating structure, wherein they are each positioned in such a way that they capture a different scattered diffraction order of the examined wavelength.

2. The device for optical applications according to claim 1, wherein more than two detectors are provided and are arranged in such a way that light of different orders that is scattered by the grating structure impinges on the detectors with their at least one filter.

3. The device for optical applications according to claim 1, wherein more than two detectors are provided and are arranged in such a way that light of different wavelength ranges that is scattered by the grating structure impinges on the detectors with their at least one filter.

4. The device for optical applications according to claim 2, wherein different filters are provided in order to be able to evaluate a plurality of wavelengths from the measured values of the detectors that result therefrom.

5. The device for optical applications according to claim 2, wherein some of the filters are polarization filters, so that a measurement of the change in polarization of the light in the optical waveguide is produced.

6. The device for optical applications according to claim 1, wherein the spacing of the individual ellipsoid structural elements inside of the grating structure is larger than 120% of the examined wavelength, in relation to the index of refraction in the optical waveguide.

7. The device for optical applications according to claim 1, wherein at least one fiber Bragg grating is placed along the optical waveguide.

8. The device for optical applications according to claim 1, wherein the optical waveguide is a single-mode, multi-mode, double-clad, or multicore glass fiber.

9. The device for optical applications according to claim 1, wherein the light source is a LED, SLED, micro LED, laser, or tunable laser.

* * * * *